United States Patent
Kim

(10) Patent No.: US 10,749,185 B2
(45) Date of Patent: Aug. 18, 2020

(54) SECONDARY BATTERY

(71) Applicant: LG CHEM, LTD., Seoul (KR)

(72) Inventor: Min-Kyung Kim, Daejeon (KR)

(73) Assignee: LG Chem, Ltd. (KR)

(*) Notice: Subject to any disclaimer, the term of this patent is extended or adjusted under 35 U.S.C. 154(b) by 216 days.

(21) Appl. No.: 15/765,618

(22) PCT Filed: Jul. 4, 2017

(86) PCT No.: PCT/KR2017/007105
§ 371 (c)(1),
(2) Date: Apr. 3, 2018

(87) PCT Pub. No.: WO2018/008951
PCT Pub. Date: Jan. 11, 2018

(65) Prior Publication Data
US 2018/0316021 A1    Nov. 1, 2018

(30) Foreign Application Priority Data

Jul. 6, 2016 (KR) .................. 10-2016-0085571

(51) Int. Cl.
*H01M 4/78* (2006.01)
*H01M 10/058* (2010.01)
(Continued)

(52) U.S. Cl.
CPC .............. *H01M 4/78* (2013.01); *H01M 4/13* (2013.01); *H01M 10/0472* (2013.01);
(Continued)

(58) Field of Classification Search
CPC ........... H01M 10/0472; H01M 10/052; H01M 10/0525; H01M 10/058; H01M 4/13; H01M 4/78
See application file for complete search history.

(56) References Cited

U.S. PATENT DOCUMENTS

| 5,350,645 A | 9/1994 | Lake et al. |
| 2009/0136842 A1 | 5/2009 | Hirota |

(Continued)

FOREIGN PATENT DOCUMENTS

| CN | 101447587 A | 6/2009 |
| CN | 102810689 A | 12/2012 |

(Continued)

OTHER PUBLICATIONS

International Search Report for PCT/KR2017/007105 (PCT/ISA/210) dated Nov. 2, 2017.
(Continued)

*Primary Examiner* — Carlos Barcena
(74) *Attorney, Agent, or Firm* — Lerner, David, Littenberg, Krumholz & Mentlik, LLP

(57) ABSTRACT

Disclosed is a secondary battery. The secondary battery includes an electrode assembly having a plurality of unit electrode bodies, each electrode body including a positive electrode plate having a plurality of positive electrode uneven grooves into which a positive electrode active material is inserted, a negative electrode plate having a plurality of negative electrode uneven grooves located to face the positive electrode uneven grooves so that a negative electrode active material is inserted therein, and a unit separator interposed between the positive electrode plate and the negative electrode plate; and a case having an accommodation portion in which the electrode assembly and an electrolyte are accommodated, wherein the positive electrode plate and the negative electrode plate are symmetrical to each other on the basis of the unit separator.

4 Claims, 2 Drawing Sheets

(51) Int. Cl.
    *H01M 10/0525* (2010.01)
    *H01M 4/13* (2010.01)
    *H01M 10/04* (2006.01)
    *H01M 10/052* (2010.01)

(52) U.S. Cl.
    CPC ..... *H01M 10/058* (2013.01); *H01M 10/0525* (2013.01); *H01M 10/052* (2013.01)

(56) References Cited

U.S. PATENT DOCUMENTS

| | | |
|---|---|---|
| 2012/0135299 A1 | 5/2012 | Kwon et al. |
| 2012/0268073 A1 | 10/2012 | Morioka et al. |
| 2012/0308878 A1 | 12/2012 | Sakashita et al. |
| 2013/0017440 A1 | 1/2013 | Takano |
| 2015/0380764 A1 | 12/2015 | Heck et al. |

FOREIGN PATENT DOCUMENTS

| | | |
|---|---|---|
| CN | 105210211 A | 12/2015 |
| JP | 50-18098 Y | 6/1975 |
| JP | 2006-172773 A | 6/2006 |
| JP | 2006-331874 A | 12/2006 |
| JP | 2013-025902 A | 2/2013 |
| JP | 2017-010937 A | 1/2017 |
| KR | 10-2006-0118954 A | 11/2006 |
| KR | 10-2012-0008257 A | 1/2012 |
| KR | 10-2012-0040454 A | 4/2012 |
| KR | 10-2012-0095122 A | 8/2012 |
| KR | 10-2012-0120019 A | 11/2012 |
| KR | 10-2016-0062883 A | 6/2016 |
| WO | WO-2012131972 A1 * 10/2012 ............. H01M 4/13 |

OTHER PUBLICATIONS

Written Opinion of the International Searching Authority for PCT/KR2017/007105 (PCT/ISA/237) dated Nov. 2, 2017.
Search Report from Chinese Office Action for Application No. 2017800035869 dated Jun. 23, 2020; 2 pages.

* cited by examiner

[Fig. 1]
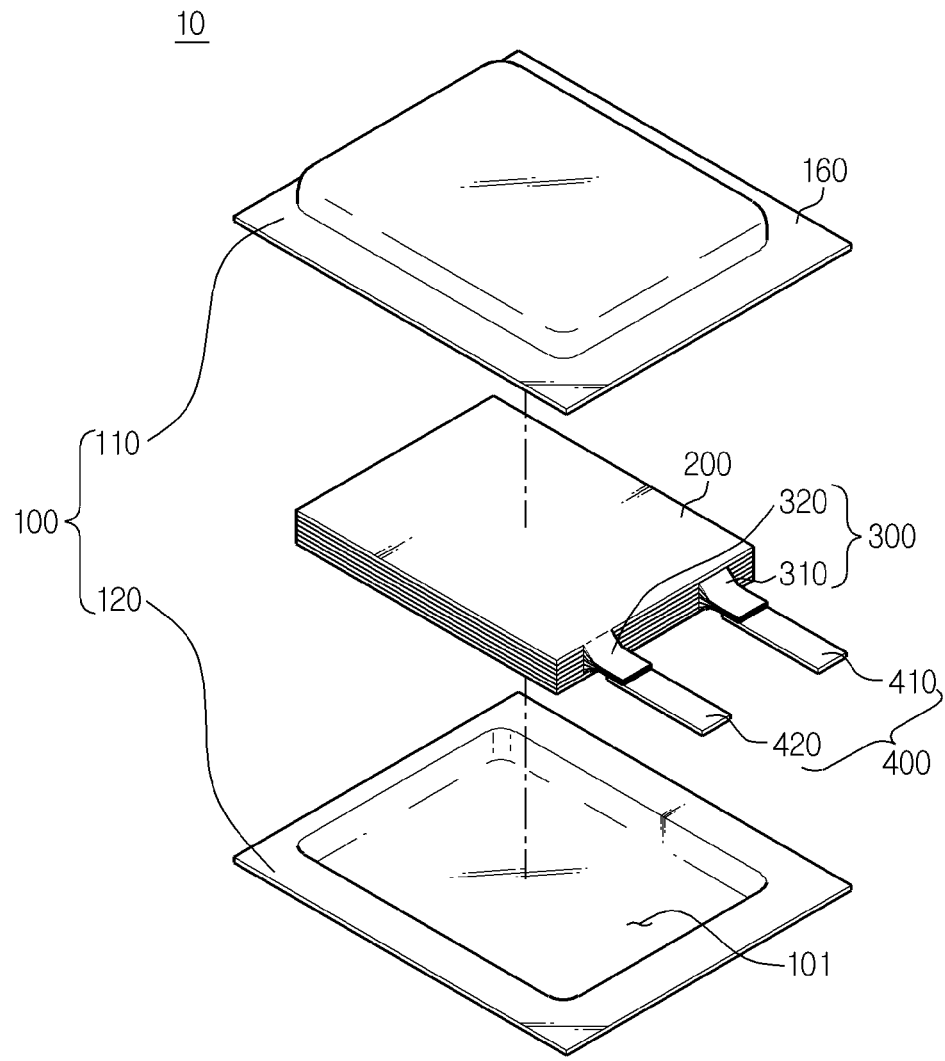
[Fig. 2]
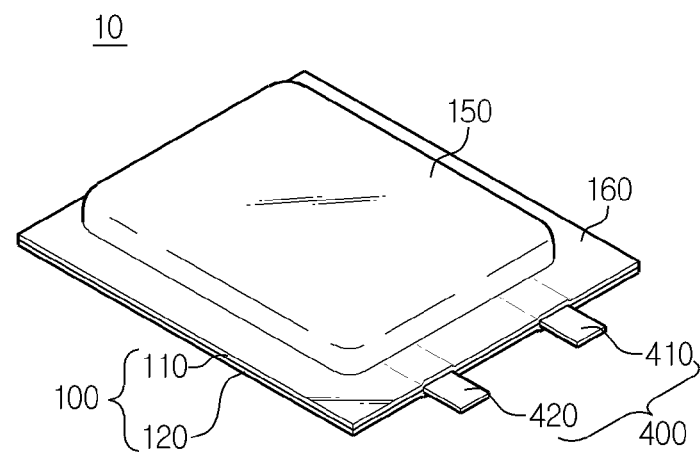

[Fig. 3]
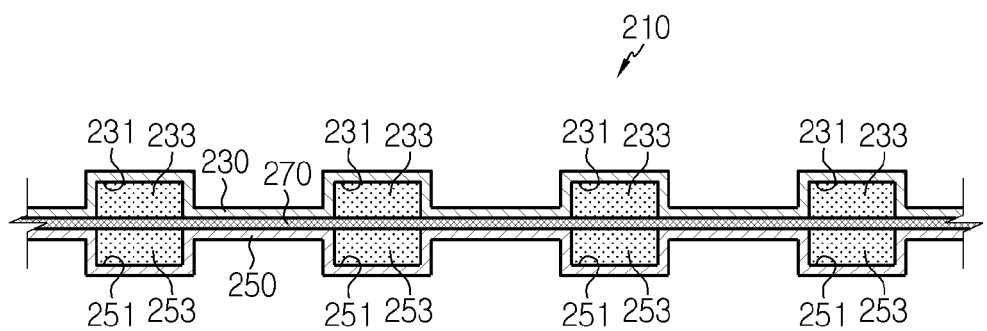
[Fig. 4]
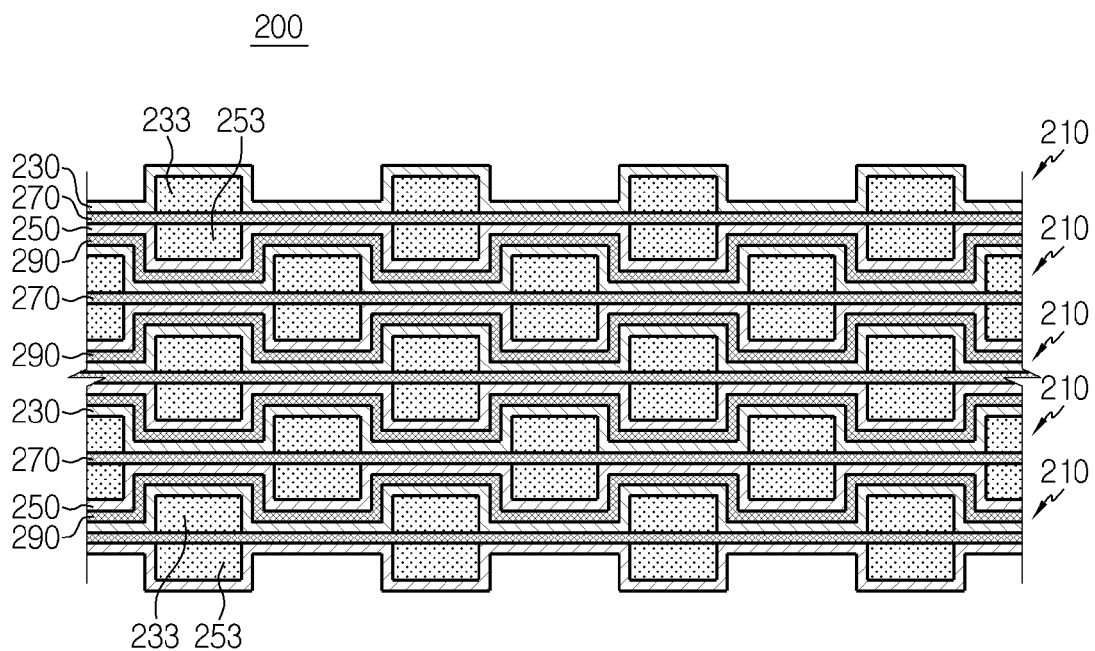

SECONDARY BATTERY

TECHNICAL FIELD

The present application claims priority to Korean Patent Application No. 10-2016-0085571 filed on Jul. 6, 2016 in the Republic of Korea, the disclosures of which are incorporated herein by reference.

The present disclosure relates to a secondary battery, more specifically, to a secondary battery having a positive electrode plate and a negative electrode plate of an uneven structure.

BACKGROUND ART

Secondary batteries are highly applicable to a variety of product groups and have electrical characteristics with high energy density. Such secondary batteries are applied not only to portable electronic devices but also to electric vehicles, hybrid vehicles, power storage devices and the like, driven by electric driving sources.

A battery pack applied to an electric vehicle or the like has a structure in which a plurality of battery modules, each having a plurality of battery cells, are connected to obtain high output. In addition, each battery cell is an electrode assembly which includes a positive electrode, a negative electrode current collector, a separator, an active material, an electrolyte and the like to allow repeated charging and discharging by an electrochemical reaction between components.

As the need for a large-capacity structure as an energy storage source has increased recently, there is a growing demand for a battery pack of a multi-module structure in which a plurality of secondary batteries connected in series or in parallel are grouped.

Meanwhile, the charging or discharging process of a secondary battery generates heat by electrochemical reactions. If the heat generated by the battery module during charging and discharging is not effectively removed, heat accumulation may occur. In this case, the battery may be degraded faster, and in some cases, fire or explosion may occur.

DISCLOSURE OF INVENTION

Technical Problem

The present disclosure is directed to providing a secondary battery having an electrode assembly capable of emitting the heat generated by the secondary battery.

In addition, the present disclosure is also directed to providing a secondary battery having an electrode assembly with a new structure.

The present disclosure is not limited thereto, and other objects not mentioned herein may be clearly understood by those skilled in the art from the following description.

Solution to Problem

The present disclosure provides a secondary battery.

According to an embodiment of the present disclosure, the secondary battery comprises an electrode assembly having a plurality of unit electrode bodies, each electrode body including a positive electrode plate having a plurality of positive electrode uneven grooves into which a positive electrode active material is inserted, a negative electrode plate having a plurality of negative electrode uneven grooves located to face the positive electrode uneven grooves so that a negative electrode active material is inserted therein, and a unit separator interposed between the positive electrode plate and the negative electrode plate; and a case having an accommodation portion in which the electrode assembly and an electrolyte are accommodated, wherein the positive electrode plate and the negative electrode plate are symmetrical to each other on the basis of the unit separator.

In an embodiment, the plurality of unit electrode bodies may be located to be stacked in one direction.

In an embodiment, adjacent positive electrode uneven grooves or negative electrode uneven grooves of adjacent unit electrode bodies may be engaged with the negative electrode plate or the positive electrode plate by fitting.

In an embodiment, the secondary battery may further comprise separators respectively interposed between the plurality of unit electrode bodies.

In an embodiment, the separator may be shaped to correspond to the positive electrode plate or the negative electrode plate adjacent thereto.

Advantageous Effects of Invention

The present disclosure gives the following effects.

In an embodiment of the present disclosure, an electrode assembly including a positive electrode plate and a negative electrode plate with a plurality of uneven grooves is provided, and the heat dissipation effect of the secondary battery may be maximized.

The effects of the present disclosure are not limited to the above, and effects not mentioned herein may be clearly understood by those skilled in the art from the specification and the accompanying drawings.

BRIEF DESCRIPTION OF DRAWINGS

FIG. 1 is an exploded perspective view showing a secondary battery according to an embodiment of the present disclosure.

FIG. 2 is an assembled perspective view showing the secondary battery of FIG. 1.

FIG. 3 is a cross-sectional view showing a unit electrode body, employed at an electrode assembly of FIG. 1.

FIG. 4 is a cross-sectional view showing that a plurality of unit electrode bodies are stacked in the electrode assembly of FIG. 1.

BEST MODE FOR CARRYING OUT THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

FIG. 1 is an exploded perspective view showing a secondary battery according to an embodiment of the present disclosure, and FIG. 2 is an assembled perspective view showing the secondary battery of FIG. 1.

Referring to FIGS. 1 and 2, a secondary battery 10 is a chargeable and dischargeable battery. For example, the secondary battery 10 may be a pouch-type secondary battery. Hereinafter, the secondary battery 10 of the present disclosure will be described as a pouch-type secondary battery.

The secondary battery 10 includes a case 100, an electrode assembly 200, an electrode tab 300 and an electrode lead 400.

The case 100 may have an inner space 101. In the case 100, an electrode assembly 200 and an electrolyte, explained later, may be accommodated. A central region of the case 100 may be provided to protrude up and down. The case 100 includes an upper case 110 and a lower case 120.

The upper case 110 and the lower case 120 are combined with each other to form the inner space 101. A central region of the upper case 110 may have a concave shape protruding upwards. The lower case 120 is located under the upper case 110. A central region of the lower case 120 may have a concave shape protruding downwards. Alternatively, the inner space of the case 100 may be formed only in the upper case 110 or the lower case 120.

The upper case 110 and the lower case 120 have a sealing portion 160, respectively. The sealing portion 160 of the upper case 110 and the sealing portion 160 of the lower case 120 may be provided to face each other. The sealing portion 160 of the upper case 110 and the sealing portion 160 of the lower case 120 may be adhered to each other by thermally bonding inner adhesive layers located at inner sides thereof. The inner space 101 may be sealed by adhering the sealing portions 160.

In the inner space 101 of the case 100, the electrolyte and the electrode assembly 200 are accommodated. The case 100 may have an outer insulating layer, a metal layer and an inner adhesive layer. The outer insulating layer may prevent external moisture, gas or the like from penetrating therein. The metal layer may improve the mechanical strength of the case 100. The metal layer may be made of aluminum. Alternatively, the metal layer may be any one selected from the group consisting of alloy of iron, carbon, chrome and manganes; nickel; nickel alloy; aluminum; and their equivalents. If the metal layer is made of a material containing iron, the mechanical strength may be increased. If the metal layer is made of a material containing aluminum, the flexibility may be good. In an embodiment, the metal layer may be made of aluminum. The outer insulating layer and inner adhesive layer may be made of a polymeric material.

The electrode assembly 200 includes a unit electrode body 210 and a separator 290.

FIG. 3 is a cross-sectional view showing a unit electrode body, employed at the electrode assembly of FIG. 1.

Referring to FIG. 3, the unit electrode body 210 includes a positive electrode plate 230, a negative electrode plate 250 and a unit separator 270. A plurality of unit electrode bodies 210 may be provided. The plurality of unit electrode bodies 210 may be provided to be stacked in one direction.

The positive electrode plate 230 may have a positive electrode uneven groove 231. A plurality of positive electrode uneven grooves 231 may be provided. The plurality of positive electrode uneven grooves 231 may be spaced apart from each other by a certain distance. The positive electrode uneven groove 231 may be provided to protrude upwards. The cross section of the positive electrode uneven groove 231 may have a rectangular shape. A portion of the positive electrode plate 230 between adjacent positive electrode uneven grooves 231 may be provided to extend horizontally.

The positive electrode plate 230 may be made of aluminum. Alternatively, the positive electrode plate 230 may have be made of stainless steel, nickel, titanium, sintered carbon, or aluminum or stainless steel surface-treated with carbon, nickel, titanium, silver, or the like. Selectively, the positive electrode plate 230 may be made of a material which does not cause any chemical change to the secondary battery 10 and has high conductivity.

The positive electrode uneven groove 231 may be provided with a positive electrode active material 233 inserted therein. The positive electrode active material 233 may be a lithium-based active material. For example, metal oxides such as $LiCoO_2$, $LiNiO_2$, $LiMnO_2$, $LiMn_2O_4$, $LiFePO_4$ and $Li_{1+z}Ni_{1-x-y}Co_xM_yO_2$ ($0 \leq x \leq 1$, $0 \leq y \leq 1$, $0 \leq x+y \leq 1$, $0 \leq Z \leq 1$, M is metal such as Al, Sr, Mg, La and Mn) may be used.

The negative electrode plate 250 may have a negative electrode uneven groove 251. A plurality of negative electrode uneven grooves 251 may be provided. The plurality of negative electrode uneven grooves 251 may be spaced apart from each other by a certain distance. The negative electrode uneven groove 251 may be provided to protrude downwards. The negative electrode uneven groove 251 may be positioned corresponding to the positive electrode uneven groove 231. The cross section of the negative electrode uneven groove 251 may have a rectangular shape. A portion of the negative electrode plate 250 between adjacent negative electrode uneven grooves 251 may be provided to extend horizontally.

The negative electrode plate 250 may be made of a copper material. Alternatively, the negative electrode plate 250 may be made of stainless steel, aluminum, nickel, titanium, sintered carbon, or copper or stainless steel surface-treated with carbon, nickel, titanium, silver or the like. Selectively, an aluminum-cadmium alloy may be provided.

The negative electrode uneven groove 251 may be provided with a negative electrode active material 253 inserted therein. The negative electrode active material 253 may be a carbon-based active material. For example, the negative electrode active material 253 may be a carbon material such as a crystalline carbon, an amorphous carbon, a carbon composite or a carbon fiber, a lithium metal, a lithium alloy, or the like. Unlike the above examples, the types and chemical compositions of the positive electrode active material 233 and the negative electrode active material 253 may be provided differently depending on the type of the secondary battery 10.

The unit separator 270 may be interposed between the positive electrode plate 230 and the negative electrode plate 250. The unit separator 270 may be provided to extend in one direction. The shapes of the positive electrode plate 230 and the negative electrode plate 250 may be symmetrical to each other on the basis of the unit separator 270.

The unit separator 270 may be made of a porous material. For example, the unit separator 270 may be made of a porous polymer membrane such as a polyolefin film, a polyvinylidene fluoride-hexafluoro propylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, polyimide, polyethylene terephthalate, polybutylene terephthalate, polyester, polyacetal, polyamide, polyetheretherketone, polyether sulfone, polyphenylene oxide, polyphenylene sulfide, polyethylene naphthalene, a non-woven film, a membrane with a porous web structure, or a mixture thereof.

FIG. 4 is a cross-sectional view showing that a plurality of unit electrode bodies are stacked in the electrode assembly of FIG. 1.

Referring to FIG. 4, the unit electrode bodies 210 may be provided to be stacked on each other. For an example, as shown in FIG. 4, the unit electrode bodies 210 may be stacked in an upper direction. The positive electrode uneven grooves 231 or the negative electrode uneven grooves adjacent to each other in adjacent unit electrode bodies 210 may be engaged with the negative electrode plate 250 or the positive electrode plate 230 by fitting.

For example, among adjacent unit electrode bodies 210, the positive electrode plate 230 of the unit electrode body 210 located below and the negative electrode plate 250 of the unit electrode body 210 located above may be adjacent to each other. The positive electrode uneven groove 231 of the positive electrode plate 230 of the unit electrode body 210 located below may be coupled to the space between the negative electrode uneven grooves 251 of the unit electrode body 210 located above. The negative electrode uneven groove 251 of the unit electrode body 210 located above may be coupled to the space between the positive electrode uneven grooves 231 of the unit electrode body 210 located below.

The unit electrode bodies 210 may be coupled to each other without any remaining space through the above coupling method. In FIG. 4, four unit electrode bodies 210 are stacked and coupled to each other as an example. However, the present disclosure is not limited thereto, and more than four unit electrode bodies 210 may be stacked on each other.

The separator 290 may be positioned between the plurality of unit electrode bodies 210. For example, the separator 290 may be positioned between adjacent unit electrode bodies 210. The separator 290 may be positioned between the positive electrode plate 230 of the unit electrode body 210 located below and the negative electrode plate 250 of the unit electrode body 210 located above. The separator 290 may be shaped corresponding to the positive electrode plate 230 of the unit electrode body 210 located below or the negative electrode plate 250 of the unit electrode body 210 located below.

The separator 290 may be made of a porous material. For example, the separator 290 may be made of the same material as the unit separator 270.

As described above, the positive electrode plate 230 and the negative electrode plate 250 may be configured to have a positive electrode uneven groove 231 and a negative electrode uneven groove 251, respectively, so that the contact surface area may be widened. By widening the contact surface area of the positive electrode plate 230 and the negative electrode plate 250, the effect of releasing the heat generated in the electrode assembly 200 to the outside may be maximized. In addition, due to the structure of the uneven grooves of the positive electrode plate 230 and the negative electrode plate 250, the adhesive force may be enhanced when the unit electrode bodies 210 are coupled.

Referring to FIGS. 1 and 2 again, the electrode tab 300 may be extended to protrude from the electrode assembly 200. The electrode tab 300 includes a positive electrode tab 310 and a negative electrode tab 320. The positive electrode tab 310 may extend from a non-coated portion of the positive electrode plate 230, and the negative electrode tab 320 may extend from a non-coated portion of the negative electrode plate 250. A single positive electrode tab 310 and a single negative electrode tab 320 may be provided for each secondary battery 10. Alternatively, it is also possible that a plurality of positive electrode tabs 310 and a plurality of negative electrode tabs 320 are provided.

The electrode lead 400 may electrically connect the secondary battery 10 to other external devices. The electrode lead 400 may include a positive electrode lead 410 and a negative electrode lead 420. The electrode lead 400 may be provided to extend from the inside of the case to the outside of the case 100. A portion of the electrode lead 400 may be interposed between the sealing portions 160. The electrode lead 400 is connected to the electrode tab 300. The electrode lead 400 of the present disclosure may be provided with both the positive electrode lead 410 and the negative electrode lead 420 on one side of the case 100. Alternatively, it is also possible that the positive electrode lead 410 is provided on one side of the case 100 and the negative electrode lead 420 is provided on the other side of the case 100.

The secondary battery 10 has an accommodation portion 150 and a sealing portion 160. Here, the accommodation portion 150 is a portion where the electrode assembly 200 is accommodated in the secondary battery 10. The sealing portion 160 is formed at four sides of the case 100 surrounding the accommodation portion 150, which are sealed.

According to an embodiment of the present disclosure as described above, the secondary battery 10 including the electrode assembly 200 of a new structure where the positive electrode plate 230 and the negative electrode plate 250 have larger surface areas, compared with an existing electrode assembly, and thus the heat generated by the secondary battery 10 may be effectively dissipated.

The above description illustrates the present disclosure. In addition, the above contents explain a preferred embodiment of the present disclosure, and the present disclosure may allow various combinations, modifications and environments. In other words, the present disclosure may be changed or modified within the scope of the concept of invention disclosed herein, the disclosed contents, their equivalents and/or the techniques and knowledge in the art. The disclosed embodiment shows a best state to implement the technical feature of the present disclosure, and this can be modified in various ways as demanded in the detailed fields and applications of the present disclosure. Therefore, the detailed description is not intended to limit the present disclosure as disclosed, but the appended claims should be interpreted as including other embodiments.

The invention claimed is:

1. A secondary battery, comprising: an electrode assembly having a plurality of unit electrode bodies, each electrode body including a positive electrode plate having a plurality of positive electrode uneven grooves into which a positive electrode active material is inserted, a negative electrode plate having a plurality of negative electrode uneven grooves located to face the positive electrode uneven grooves so that a negative electrode active material is inserted therein, and a unit separator interposed between the positive electrode plate and the negative electrode plate; and a case having an accommodation portion in which the electrode assembly and an electrolyte are accommodated, wherein the positive electrode plate and the negative electrode plate are symmetrical to each other on the basis of the unit separator, wherein each positive electrode plate comprises one or more spaces disposed between adjacent positive electrode uneven grooves and each negative electrode plate comprises one or more spaces disposed between adjacent negative electrode uneven grooves, and wherein adjacent positive and negative electrode plates are engaged with one another so that one or more of the positive electrode uneven grooves are fitted into one or more of the negative electrode spaces and one or more of the negative electrode uneven grooves are fitted into one or more of the positive electrode spaces.

2. The secondary battery according to claim 1, wherein the plurality of unit electrode bodies are located to be stacked in one direction.

3. The secondary battery according to claim 1, wherein the secondary battery further comprises separators respectively interposed between the plurality of unit electrode bodies.

4. The secondary battery according to claim 3, wherein the separator is shaped to correspond to the positive electrode plate or the negative electrode plate adjacent thereto.

* * * * *